United States Patent [19]
Williams

[11] Patent Number: 5,810,341
[45] Date of Patent: Sep. 22, 1998

[54] TRUSS TABLE WITH INTEGRATED POSITIONING STOPS

[75] Inventor: Thomas H. Williams, Edenton, N.C.

[73] Assignee: Tee-Lok Corporation, Edenton, N.C.

[21] Appl. No.: 735,415

[22] Filed: Oct. 22, 1996

Related U.S. Application Data

[60] Provisional application No. 60/006,169, Nov. 2, 1995.

[51] Int. Cl.⁶ ....................................................... B25B 1/20
[52] U.S. Cl. .......................... 269/37; 269/910; 269/303; 269/315; 269/289 MR
[58] Field of Search ................................ 269/37, 99, 100, 269/101, 910, 905, 303, 305, 315, 319, 289 MR

[56] References Cited

U.S. PATENT DOCUMENTS

| | | | |
|---|---|---|---|
| 2,212,421 | 8/1940 | Henderson | 29/89 |
| 2,584,021 | 1/1952 | Jackson | 269/303 |
| 2,919,733 | 1/1960 | Johnson | 144/288 |
| 2,983,292 | 5/1961 | McKinley | 144/288 |
| 3,241,585 | 3/1966 | Jureit | 144/288 |
| 3,299,920 | 1/1967 | Koenigshof | 144/288 |
| 3,421,751 | 1/1969 | Menge | 269/305 |
| 3,622,145 | 11/1971 | Gibson | 269/305 |
| 3,667,379 | 6/1972 | Templin | 100/139 |
| 4,013,282 | 3/1977 | Kaufmann et al. | 269/289 MR |
| 4,084,498 | 4/1978 | Weaver | 100/210 |
| 4,379,426 | 4/1983 | Thompson et al. | 100/100 |
| 4,453,705 | 6/1984 | McDonald | 269/37 |
| 4,514,901 | 5/1985 | Kirby | 29/822 |
| 4,567,821 | 2/1986 | McDonald | 100/100 |
| 4,627,564 | 12/1986 | Bowser | 227/152 |
| 4,669,184 | 6/1987 | Castillo | 29/798 |
| 4,819,475 | 4/1989 | Irvello | 72/447 |
| 4,943,038 | 7/1990 | Harnden | 269/37 |
| 4,998,336 | 3/1991 | Papsdorf | 29/432 |
| 5,085,414 | 2/1992 | Weaver | 269/37 |
| 5,092,028 | 3/1992 | Harnden | 29/709 |
| 5,211,108 | 5/1993 | Gore et al. | 100/48 |
| 5,215,296 | 6/1993 | Adams et al. | 269/303 |
| 5,342,030 | 8/1994 | Taylor | 269/910 |
| 5,385,339 | 1/1995 | Williams | 269/37 |
| 5,388,318 | 2/1995 | Petta | 29/407 |
| 5,435,411 | 7/1995 | Borgatti | 269/289 MR |
| 5,608,970 | 3/1997 | Owen | 269/910 |

*Primary Examiner*—James G. Smith
*Assistant Examiner*—Lee Wilson
*Attorney, Agent, or Firm*—Myers Bigel Sibley & Sajovec, P.A.

[57] ABSTRACT

A table for forming trusses comprises a support frame and first and second substantially horizontally-disposed elongate panels wherein each of the panels has an upper surface, a lower surface, and opposing lateral edge portions with a gap being formed between the panels. A first channel is also included and has a generally horizontal floor and opposed side walls extending upwardly therefrom. One of the side walls supports the lower surface of the first panel, and the other of the side walls supports the second panel. The floor is supported by the frame and is positioned beneath the gap. The table also includes magnetic positioning indicia mechanism located within the channel and magnetically attached to the first channel floor.

9 Claims, 7 Drawing Sheets

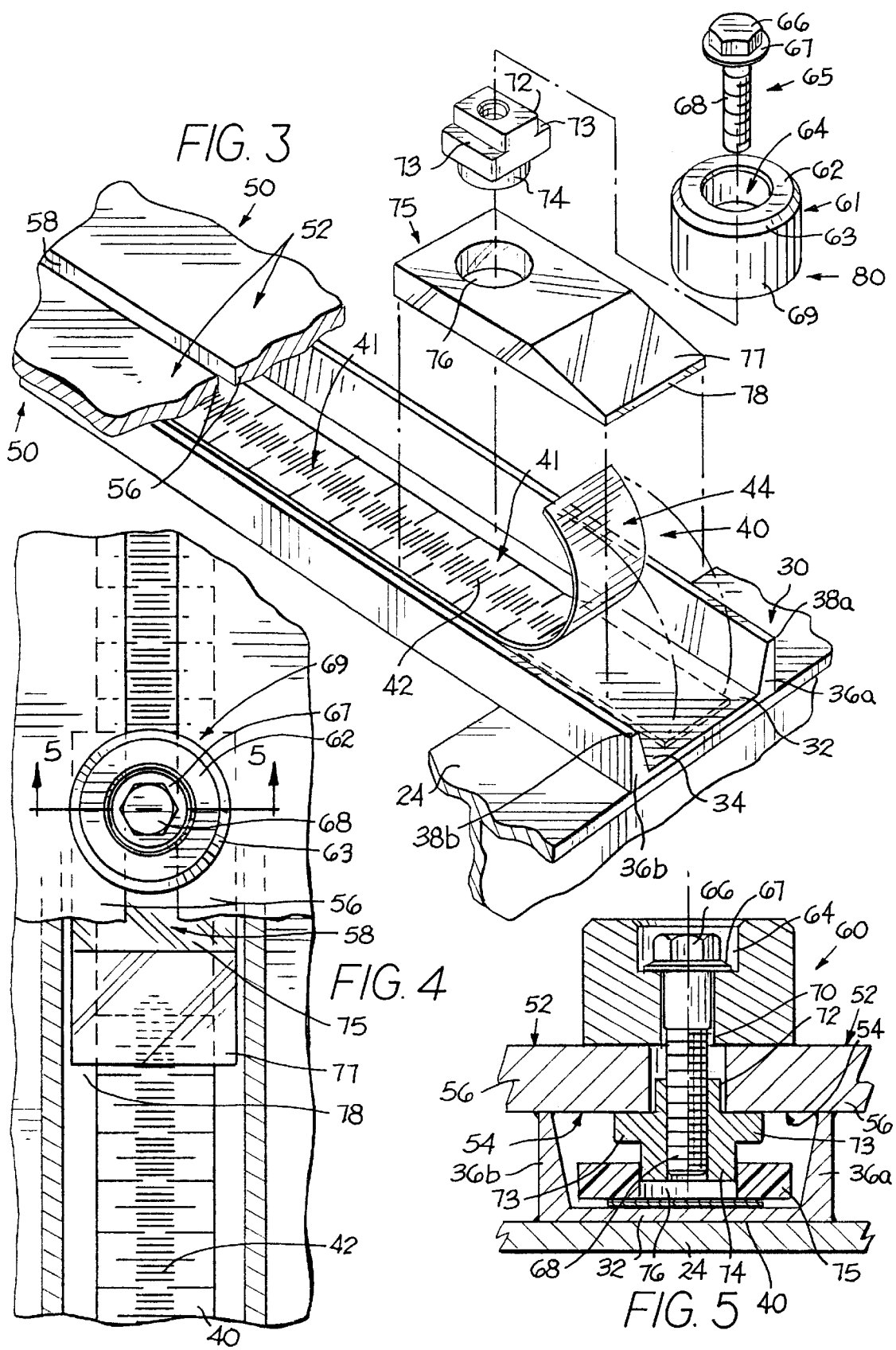

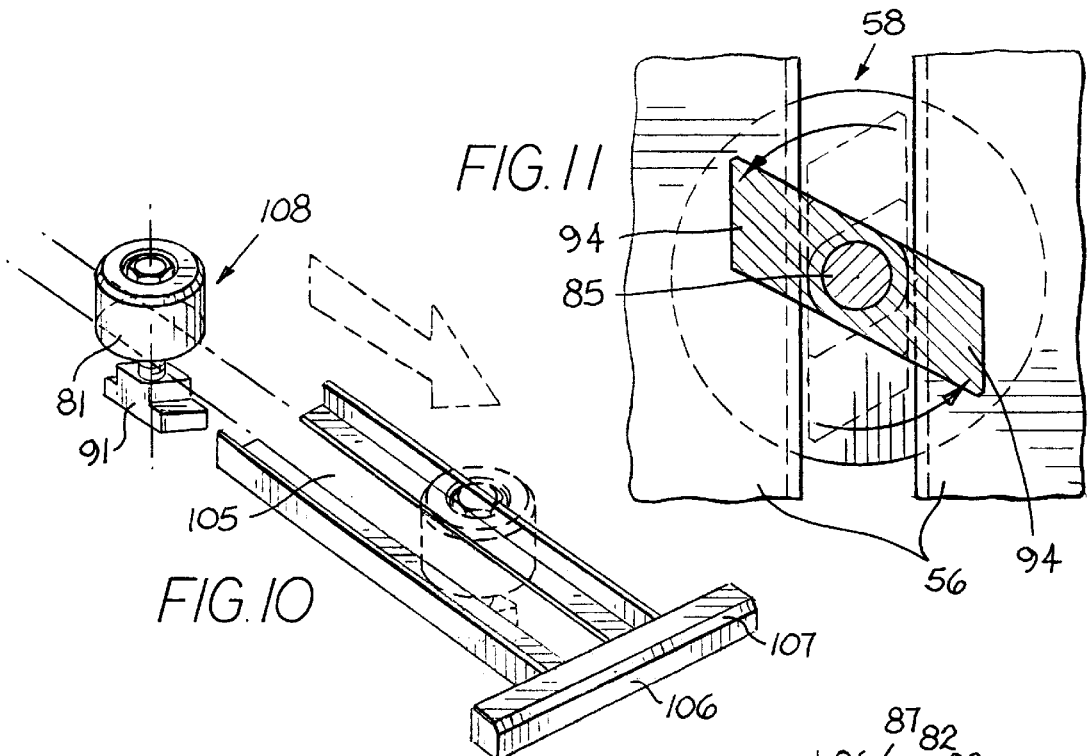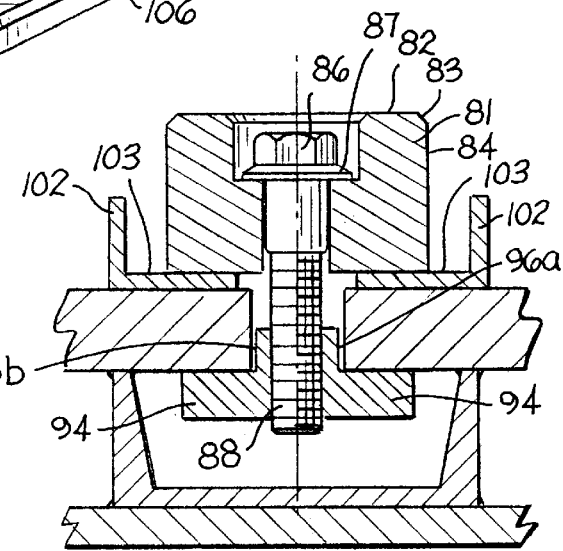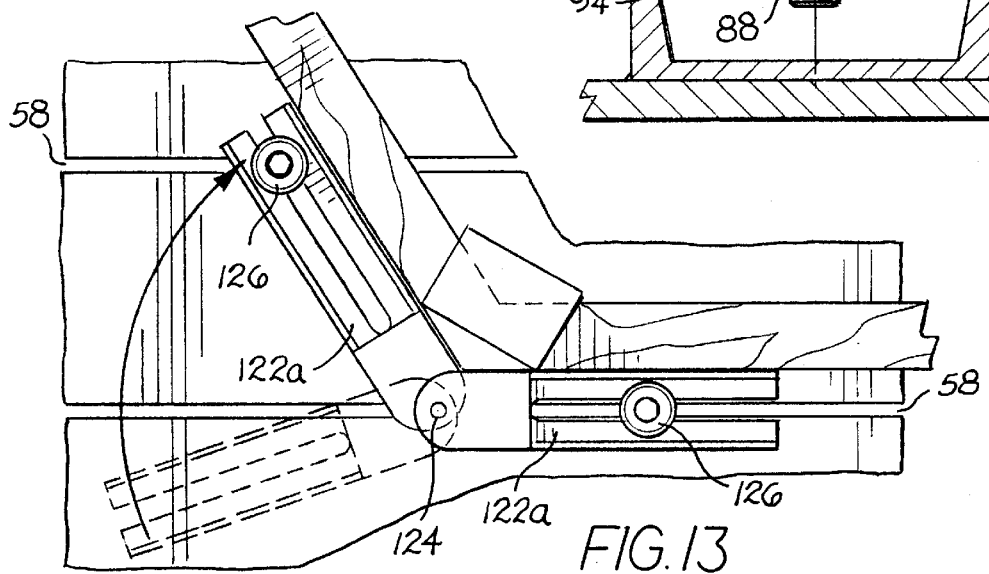

TRUSS TABLE WITH INTEGRATED POSITIONING STOPS

RELATED APPLICATIONS

This application claims priority from U.S. Provisional Application Ser. No. 60/006,169, entitled TRUSS TABLE WITH INTEGRATED POSITIONING STOPS, filed 2 Nov. 1995.

FIELD OF THE INVENTION

This invention relates generally to truss tables, and more particularly relates to truss tables having integrated positioning stops.

BACKGROUND OF THE INVENTION

Trusses for the roof and floor of a dwelling typically comprise a series of lumber planks arranged in a triangulated pattern. Truss design varies from house to house because of consumer demand for individualized home design, but within a single home generally several trusses of identical configuration will be employed.

A particularly time-consuming task of truss construction is the "set-up" process, which is the placement of locator stops on a truss table into positions in which they force truss planks into the proper position and orientation for subsequent attachment. Each set of planks is precut to the proper length and end angle, but must be arranged on a truss table in the correct triangulated truss configuration prior to being fixed into that configuration with truss plates.

Because set-up can be so time consuming, generally a set-up system is used to hasten the set-up process. A set-up system typically includes a number of locator stops, or "jigs", which are positioned on the truss table in a pattern that defines the proper placement of planks on the table. These jigs are typically disk-shaped and include some means for securing themselves to the truss table. The positions of the jigs are usually predetermined for the truss manually or by a software program associated with the set-up system, such as the FREEFORM program offered by Trenco Engineering, Edenton, N.C. The planks are then arranged on the table, with their positions and relative orientations being defined by the positions of the set-up jigs. Other locator stops and fixtures, which can take the form of additional disks or flat surfaces that abut portions of a plank, are then placed around the planks based on the location of the planks and secured to the truss table.

Once the locator stops and fixtures are properly positioned, the planks are attached to one another by a pressure roller or hydraulic press which presses a connecting truss plate into adjoining planks to form the truss. The completed truss is removed from the table, and another set of planks is guided into position within the locator stops and fixtures. The locator stops remain in place until all trusses of the selected configuration have been formed. They are then removed, and the set-up jigs, locator stops, and fixtures are once again positioned on and secured to the table to define the configuration for the next truss configuration.

Set-up systems with positioning capability have been offered in a variety of configurations. For example, U.S. Pat. No. 5,085,414 to Weaver discloses a jig for forming trusses which includes a block designed to fit within the rails of a C-shaped channel that extends along the length of the surface of a truss table. The C-shaped channel, which is recessed within adjacent panels of the table, includes inwardly-directed lips that capture the aforementioned block. A disk-shaped stop is connected with the block by a threaded clamping bolt. The jig can be moved along the length of the C-channel and fixed at a predetermined location in which the stop can define a portion of the truss. A measuring scale fits atop and extends along the length of one of the C-channel rails, and a pointer extends from the block toward the scale to provide the operator with a reference point for positioning the jig during set-up.

Another exemplary set-up jig configuration is shown in U.S. Pat. No. 4,493,038 to Harnden. This truss assembly apparatus includes a jig positioned upon a worm gear located within a C-channel. Rotation of the worm gear causes the jig to translate within the C-channel to the desired predetermined location for set-up.

Each of these C-channel-based set-up jig configurations requires that the C-channel be positioned below the table surface so that the top lips of the C-channel are level with the table surface. Although this configuration is suitable for truss tables with wooden table surfaces, it is not particularly suitable for the newer, more preferred steel-topped tables. The table surface of a steel-topped table has a relatively thin depth profile (compared to wooden table surfaces) and preferably is provided to the operator as a single slab; this can preclude the recessing of a C-channel therein.

Another significant shortcoming of these jigging systems is that the top lips of the C-channel of Weaver and the teeth of the worm gear of Harnden are prone to deflect permanently when under stress. Such stress often results when slightly warped planks are bent and forced into place after the set-up jigs are positioned. The forces exerted on the stops of the jigs by the deflected planks can easily be of sufficient magnitude to cause the lips of the C-channel to deform permanently. The deformation can be significant enough that the jig contained therein can no longer move freely within the C-channel, and thus is no longer usable. Deformation of the C-channel lips is particularly likely when the set-up jigs are used for both set-up and manufacturing processes. As a result, the C-channel-based jigging systems are only suitable for the set-up process and should not be used as semi-permanent locator stops.

Another set-up jig design suggested for use with steel-topped tables is illustrated in U.S. Pat. No. 5,385,339 to Williams. The Williams set-up jig is a steel block having a recess on its lower surface that mates with a thin metal ruler that extends across the length of the truss table. The steel block slides upon the ruler and is fixed into a predetermined position by a bolt inserted through a laterally positioned aperture in the block and into one of the grid holes of the truss table. The most serious shortcoming of this jigging system is the susceptibility of the ruler to become bent along its edges by contact with truss planks; once this occurs, the steel block no longer slides smoothly on the ruler. Also, this system is intended to be used for set-up alone and not actual truss manufacture.

One steel-topped table that addresses some of these shortcomings is described in co-pending and co-assigned U.S. patent application Ser. No. 08/552,283 to Williams, entitled TRUSS TABLE WITH INTEGRATED POSITIONING STOPS ("the Williams Application"), the disclosure of which is hereby incorporated herein in its entirety. The truss table disclosed therein includes a plurality of steel panels positioned to have gaps between their side edges. Locator stops are positioned within the gaps and can be clamped directly to the side edges of adjacent panels, which are far stronger and more rigid than the lips of the C-channel employed in prior art tables.

Another difficulty faced by truss manufacturers is the alignment of adjacent truss tables. Truss tables are typically constructed with relatively few C-channel rails (perhaps 6 to 8 per table) spaced at intervals of about 6 to 10 inches. Of course, a typical truss (e.g., one that is 45 feet in length) cannot fit onto a single table of this size. As a result, truss manufacturers employ several truss tables positioned side-by-side to support the entire truss. The employment of multiple tables that include some type of positioning system supported by a truss engineering software program, such as that of Weaver, Harnden, or Williams, requires that each of the tables be precisely aligned or registered with the remaining tables in order for the positioning system to be useful; otherwise, the positioning system will indicate a position for the locator stops of some tables that is longitudinally offset from proper alignment. Because truss tables can be quite heavy, it is somewhat difficult to position them precisely. Also, it may not be apparent to the operator if the tables become misaligned during repeated operations.

It has been suggested that, instead of shifting the tables to their proper positions, a laser image of the truss be projected onto the table surfaces. See U.S. Pat. No. 5,383,318 to Petta. The use of an overhead imaging system eliminates the need for precise table positioning. However, these systems are quite expensive, and therefore are not practical for many truss manufacturers. In addition, the laser image is often difficult to discern unless the truss manufacturing facility is kept quite dark, a working condition that can be difficult or even dangerous. These deficiencies render imaging systems inadequate for many manufacturers.

One solution to this problem offered in the Williams Application is the use of a scale that can be adjusted longitudinally within the gap between adjacent panels. The adjustability of the scales of adjacent tables enables the scales to be registered, therefore ensuring accurate positioning of locator stops, even on adjacent tables. However, this solution is somewhat costly; the scales disclosed include slots on each end that receive tightening bolts. Of course, inclusion of these slots increases the cost of the scales.

An additional shortcoming of prior truss tables emerges when one or more of the truss planks is somewhat bowed or warped. As noted above, after the set-up process is complete, semi-permanent fixtures are placed around the truss planks to press on the planks and thereby "tighten" the joints of the truss. These fixtures are positioned, oriented and secured to the truss table based on the shape of the truss planks used for set-up. If some planks used either for set-up or in a subsequent truss are bowed or warped, the placement of the fixtures and locator stops may render placement of the later-used planks within the pattern defined by the fixtures and stops difficult, if not impossible. In addition, often during the pressing operation pressure applied to one end of a warped plank forces the opposite end of the plank to rise and become dislodged from its position within the locator stops and fixtures. Once dislodged, the plank is no longer restrained in a position within the desired pattern. When the pressure roller reaches the dislodged end, it is unable to force that end into the pattern due to the shift in position of the plank. The prior art is silent on methods of correcting this problem.

A further technical issue raised by prior art truss tables is the use of "intermediate" locator stops (i.e., locator stops positioned at locations other than below the bottom chord and above the top chord of the truss). These locator stops are used selectively, and therefore are not included in all channels of the tables. However, prior art designs render their use somewhat inconvenient, as the block of the locator stop received within the channel is of sufficient size that it can bridge the gap above the channel in order to prevent the locator stop from slipping out of the channel through the gap. As a result, the block must be inserted at the longitudinal end of the channel. This, of course, requires removal of at least one non-intermediate locator stop prior to insertion of the intermediate stop, followed by the re-insertion of the non-intermediate locator stop. Also, the intermediate stops must be inserted before the planks are arranged so that they can be positioned on the interior of the planks. Accordingly, the operator must anticipate when such stops are to be used prior to the arrangement of the planks. This inconvenience can render the use of intermediate locator stops inefficient.

Still another technical issue raised by prior art truss tables is how trusses are ejected after construction. Prior art tables typically include a mechanism that retracts within a central channel in the table during construction and extends above the channel once construction is complete to eject the truss. The mechanism can be designed to eject trusses off the end of the table (such that the trusses travel in a direction perpendicular to the channel in the truss table) or off the side of the table (such that the trusses travel in a direction parallel to the channel in the truss table). Side-eject tables typical include small wheels that rotate about horizontal axes perpendicular to the table channel and thereby roll trusses toward and off the side of the table. End-eject mechanisms typically include a long cylinder disposed parallel to the table channels that rotates about a horizontal axis parallel to the channels. End-eject mechanisms are particularly useful when used in conjunction with a lifting mechanism located at the end of the endmost truss table, such as that described in U.S. Pat. No. 5,553,375 to Powers, the disclosure of which is hereby incorporated herein by reference in its entirety. A truss construction firm typically orders a truss table having whichever of these ejection mechanisms best fill the needs of the factory. A truss table containing the desired mechanism is then built and shipped. Clearly, it would be desirable for truss table suppliers to have a single configuration that can be used to eject trusses to the side or end of the truss table.

In view of the foregoing, it is an object of the present invention to provide a truss plank positioning system suitable for use with steel panel-style truss tables, including both intermediate and non-intermediate locator stops.

It is also an object of the present invention to provide an intermediate locator stop that overcomes the inefficiency of those found in the prior art.

It is another object of the present invention to provide a truss table with an inexpensive positioning system that can be easily and precisely aligned and registered with adjacent truss tables.

It is an additional object of the present invention to provide an apparatus for adapting the locator stops of a truss table to account for warpage and bowing in truss planks.

It is a further object of the present invention to provide a truss table that can eject a truss off either its end or its side.

SUMMARY OF THE INVENTION

These and other objects are satisfied by the present invention, which provides an improved truss table and fixtures therefor. As a first aspect, the truss table of the present invention comprises a support frame, first and second substantially horizontally-disposed elongate panels, a first channel having a generally horizontal floor and opposed side walls extending upwardly therefrom, and positioning indicia means located within the channel. Each of the panels has an upper surface, a lower surface, and opposing lateral edge portions. The panels are positioned so that their respective upper surfaces are substantially coplanar and so that a first of the lateral edge portions of the first panel is in adjacent, non-contacting relationship with a first of the lateral edge portions of the second panel to form a gap therebetween. The channel is configured such that one of the side walls supports the lower surface of the first panel, and the other of the side walls supports the second panel. The floor of the channel is supported by the frame and positioned beneath the gap so that the first lateral edge portion of the first panel and the first lateral edge portion of the second panel overhang the floor. The floor is formed of a ferromagnetic material. The positioning indicia means is magnetic and magnetically attached to the first channel floor. With this configuration, the truss table can be quickly and easily registered to other tables by adjusting the position of the positioning indicia means, thereby forming a precise grid for positioning locator stops.

As a second aspect, the present invention includes a locator stop for use with a truss table that includes an upper surface, at least one elongate gap therein, and a lower surface. The locator stop comprises a stop portion that resides above the truss table upper surface, a capture portion that resides below the gap, and means for clamping the truss table upper and lower surfaces between the stop portion and capture portion. The clamping means extends within the gap. The stop portion includes a generally flat and generally horizontally-disposed upper surface, generally upright side walls beneath said upper surface, and a bevelled surface disposed between and merging with the upper surface and the side walls. The bevelled surface assists in the positioning of bowed or warped truss planks during the placement thereof and also aids warped truss planks that slip out of position during pressure rolling.

As another aspect, the present invention includes a locator stop that can be inserted into a channel in a truss table from above. The locator stop comprises a stop portion that resides above the truss table upper surface, a capture portion that resides below the gap, and means for clamping the edges of the truss table between the stop portion and the capture portion that extends within the truss table gap. The capture portion is configured such that, in a first rotative orientation, the capture portion bridges each of the truss table edge portions from underneath, and in a second rotative orientation, the capture portion contacts neither of the truss table edge portions. This configuration enables the capture portion to be lifted through and removed from the truss table gap.

It is preferred that, with such a locator stop, the clamping means be a bolt having a hexagonal head and an attached collar. This configuration renders the clamping procedure quick and simple with readily available tools.

As an additional aspect, the present invention includes a truss table having means for ejecting a completed truss from its construction surface. The ejecting means includes a lifting unit and means for rolling constructed trusses away from the construction surface. The lifting unit is connected to the frame of the truss table and to the rolling means. The lifting unit is configured to move the rolling means between a retracted position within a recessed channel in the construction surface, wherein the rolling means is positioned below the construction surface, and an extended position, wherein the rolling means is positioned above the construction surface. The rolling means is configured so that constructed trusses are free to roll in any horizontal direction.

Preferably, the rolling means comprises a plurality of ball bearings that are mounted on a mounting rail for unimpeded rotation. This configuration enables the operator to eject the truss from either the end or the side of the truss table.

BRIEF DESCRIPTION OF THE FIGURES

FIG. 3 is an enlarged perspective cutaway view of the truss table of FIG. 2 showing the relationship between the components of a primary locator stop, a channel and a magnetic scale.

FIG. 4 is an enlarged cutaway plan view of the table of FIG. 2 showing one primary locator stop positioned within a channel.

FIG. 5 is a sectional view taken along lines 5—5 of FIG. 4 showing a primary locator stop in a clamped position.

FIG. 10 is a perspective view of the fixture of FIG. 8 showing how a secondary locator stop can be positioned therein.

FIG. 11 is a bottom section view of the secondary locator stop of FIG. 10 with its rotary T-nut shown in its clamped and unclamped positions.

FIG. 12 is a side section view of the secondary locator stop of FIG. 11 in its clamped position.

FIG. 13 is an enlarged view of an angled fixture clamped into place abutting adjoining truss planks.

DETAILED DESCRIPTION OF THE PREFERRED EMBODIMENTS

The present invention will now be described more particularly hereinafter with reference to the accompanying drawings, in which present embodiments of the invention are shown. The invention may, however, be embodied in many different forms and is not limited to the embodiments set forth herein; rather, these embodiments are provided so that the disclosure will fully convey the scope of the invention to those skilled in the art.

Figure 1:
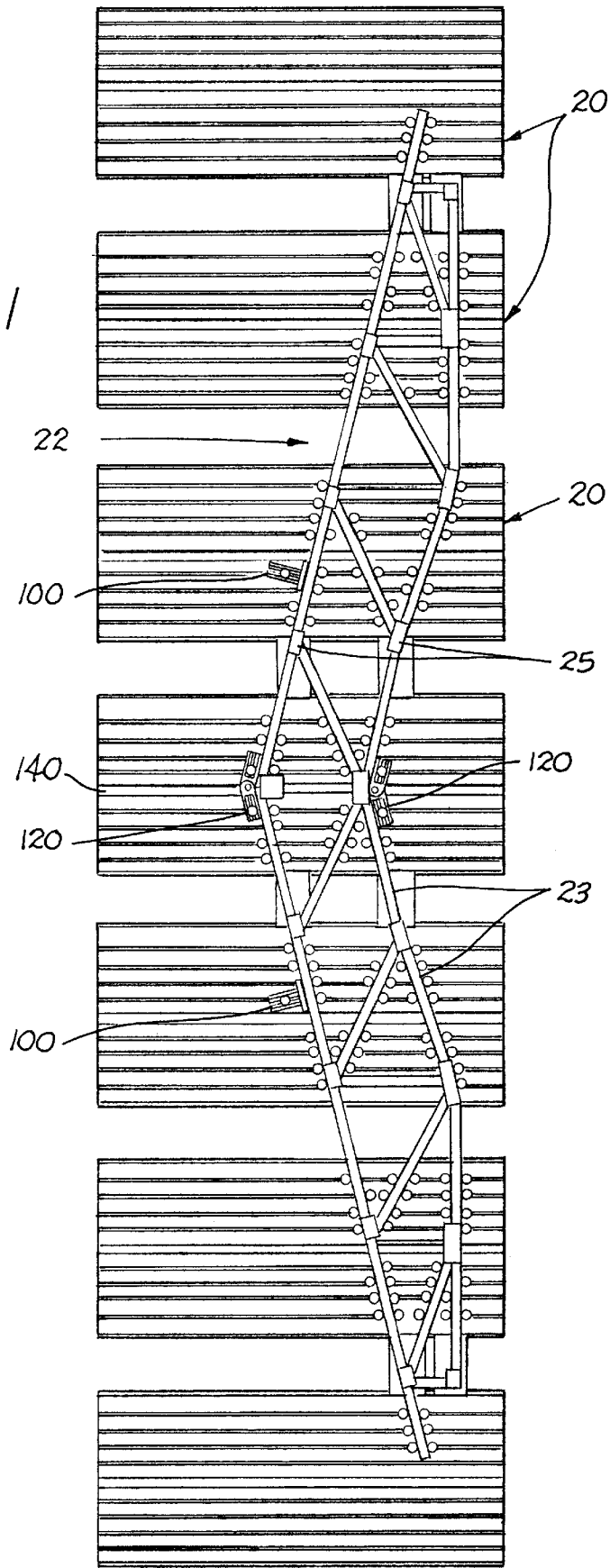
FIG. 1 is a plan view of seven truss tables of the present invention illustrating how they can be used in combination to form a single truss.

Referring now to the drawings, seven truss tables 20 upon which a truss 22 has been constructed are illustrated in FIG. 1. The truss 22 comprises a number of wooden planks 23 which are arranged in a triangulated web. The planks 23 are interconnected with one another by truss plates 25, the configuration of which can be any of those known to those skilled in this art to be suitable for interconnecting wooden planks. It should be understood that, although seven truss tables 20 are illustrated herein, any number of truss tables can be employed together to construct a larger or smaller truss than that illustrated.

Figure 2:
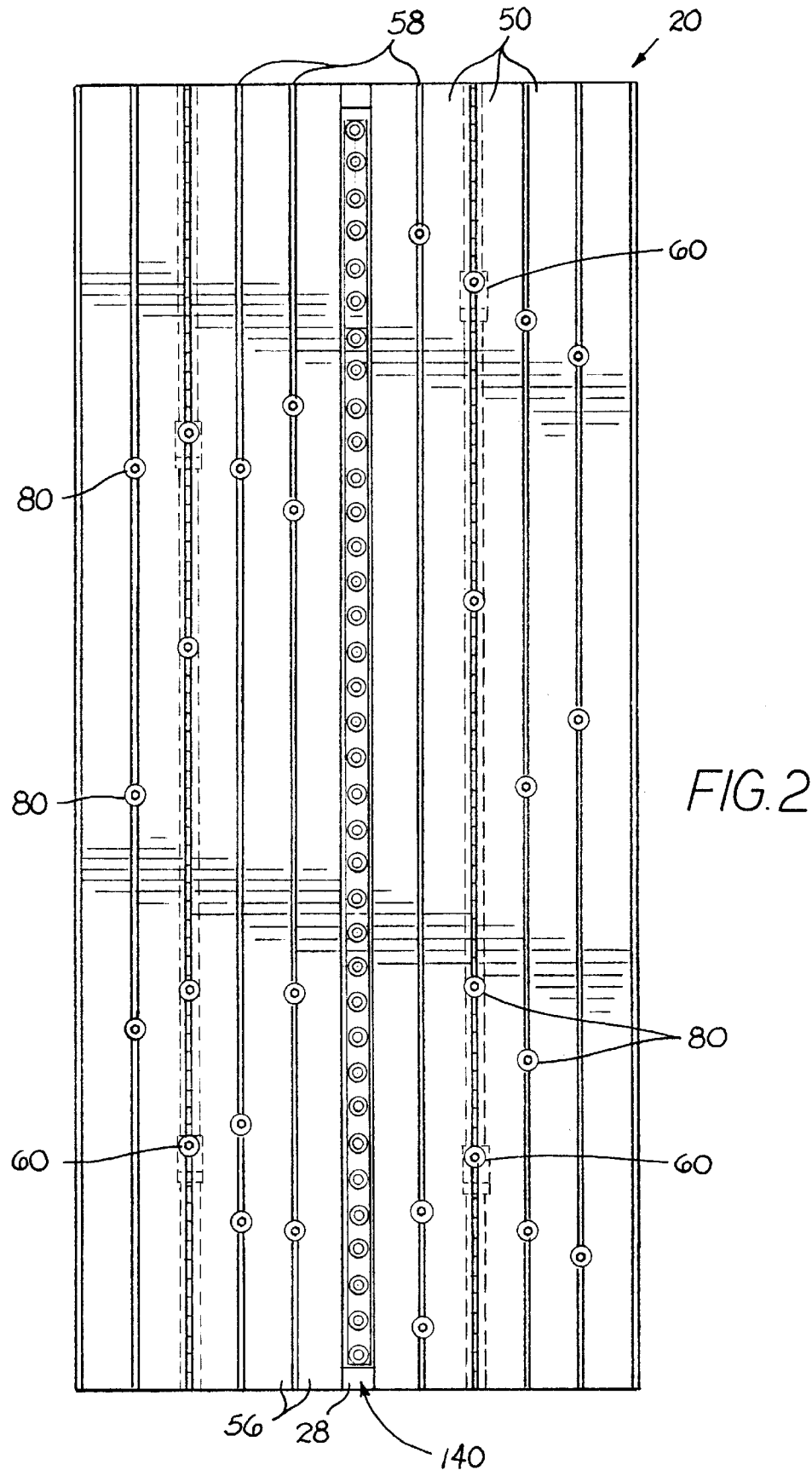
FIG. 2 is a plan view of a single table of the present invention.

Referring now to FIG. 2, a single truss table 20 is illustrated. The truss table 20 comprises ten horizontally disposed steel panels 50, each of which is approximately 6 inches in width and 0.75 inches in depth (best seen in FIG. 3). Those skilled in this art will recognize that the panels 50 can be of any desired width (e.g., 2 inches, 4 inches, 8 inches, 12 inches, or the like) or depth (e.g., ½ inch, 1 inch, or the like) that can withstand the rigors of truss construction, and individual panels 50 can be of equal or differing width as desired. The panels 50 can be of any length sufficient to support a truss being constructed thereon.

Still referring to FIGS. 2 and 3, the panels 50 are elongate and are oriented to be substantially parallel to one another. Opposed lateral edge portions 56 of adjacent panels 50 are in non-contacting adjacent relationship to the lateral edge portions 56 of adjacent panels 50, thereby forming gaps 58 therebetween. Each gap 58 is typically between about ¼ and 1 inch or greater in width and is preferably about ¾ of an inch. The upper surfaces 52 of the panels 50 support the planks 23 of each truss 22 that is constructed on the table 20.

Referring again to FIG. 2, the truss table 20 also includes primary and secondary locator stops 60, 80 that are positioned above and within the gaps 58 between adjacent panels 50. The locator stops 60, 80 help to define the triangulated pattern of the truss 22 and thus aid in placement and retain the truss planks 23 in position prior to and during the construction of a truss. Illustratively, two primary locator stops 60 are included in each of two gaps 58, and between zero and three secondary locator stops 80 are included in each gap 58. The truss table 20 also includes a centrally-located, longitudinally-extending ejector unit 140 located in a central channel 28 for ejecting trusses after construction is complete.

Referring back to FIG. 1, a pair of semipermanent fixtures 100 are included on two truss tables 20. Also, a pair of compound fixtures 120 are included with a single truss table 20. The fixtures 100, 120 also aid in placement and retention of truss planks before and during truss construction.

Referring now to FIG. 3, each pair of adjacent panels 50 is supported on its lower surface 54 by a longitudinally-extending channel 30, which is supported by a frame 24. Those skilled in this art will recognize that, although only one channel 30 is described in detail herein, this description is equally applicable to the other channels 30 of the illustrated truss table 20.

The channel 30 comprises a horizontally disposed floor 32 having an upper surface 34 and a pair of opposed, generally vertically disposed sidewalls 36a, 36b. The lower surface of the floor 32 is welded to the frame 24. The respective upper ends 38a, 38b of the sidewalls 36a, 36b are welded to the lower surface 54 of adjacent panels 50. The panels 50 are positioned relative to the sidewall upper ends 38a, 38b so that their adjacent lateral edge portions 56 overhang a portion of the floor 32, and the gap 58 between adjacent lateral edge portions 56 is above the floor 32. In this configuration, the channel 30 can capture, retain, and provide a sliding path for a sliding portion of the primary locator stops 60 and the secondary locator stops 80.

The channel 30 can be constructed from a single unitary component, such as the channel iron illustrated herein, or can be formed of two or more pieces attached to form a channel. Preferably, the channel 30 is between about ¼ and 5 inches in height (i.e., the distance between the panel lower surfaces 54 and the channel floor upper surface 34) and between about ⅜ and 10 inches in width (i.e., the distance between facing surfaces of the side walls 36a, 36b). It is preferred that the floor 32 be formed of a ferromagnetic material (defined herein as a material to which a magnetic component will adhere).

As used herein, it is intended that the term "channel" also encompass an alternative embodiment in which the frame 24 or other underlying structure forms the channel floor 32. In particular, it is envisioned that the panels and channels of the truss tables of the present invention can be formed upon an existing steel=topped or wood-topped table as described in the Williams application referenced above.

Still referring to FIG. 3, a magnetic measuring scale 40 rests upon the channel floor upper surface 34. The measuring scale 40, which extends longitudinally within the channel 30, includes positioning indicia 42 on its upper surface 41. The scales lower surface 44 contacts and overlies the channel floor 32. Preferably, the lower surface 44 is magnetized such that it will adhere to the ferromagnetic floor 32 and thereby secure the scale 40 thereto. Because the scale 40 is secured through magnetic attraction to the floor 32, it can be adjusted easily to align with other scales 40 on other tables 20.

Referring now to FIGS. 3 through 5, the primary locator stop 60 illustrated therein includes an annular stop disk 61, a slide block 75, a bolt 65, and a nut 71. The stop disk 61, which includes an upper surface 62 and a circumferential side wall 69, rests upon the upper surfaces 52 of adjacent panels 50. The upper surface 62 of the disk 61 and the side wall 69 merge into a circumferential beveled surface 63. The disk 61 also includes a centrally located recess 64 and an aperture 70 extending downwardly therefrom. Although the annular configuration of the stop disk 61 is preferred for its uniformity of contact with truss planks irrespective of their relative orientation, those skilled in this art will recognize that any means for defining a pattern of truss planks and for preventing movement of an abutting truss plank can be used with the present invention.

The bolt 65 includes a hexagonal head 66, a collar 67 that underlies and extends circumferentially away from the head 66, and a threaded shank 68. The bolt 65 extends through the recess 64 and the aperture 70 of the disk 61 and through the gap 58 between the adjacent panels 50. The shank 68 then is received within a threaded aperture in the nut 71, which includes a body 72, two wings 73 extending in opposite horizontal directions from the body 72, and a projection 74. The projection 74 protrudes from the lower surface of the body 72 and is received within a recess 76 of the slide block 75 (see FIGS. 3 and 5). The slide block 75, which is preferably formed of a transparent material, such as polycarbonate, also includes a bevel 77 at its forward end and a sighting edge 78. The slide block 75 is positioned within the channel 30 to slide upon the scale 40.

Those skilled in this art will appreciate that, although the primary locator stop 60 illustrated herein is preferred, other locator stop configurations can also be used with the present invention. The primary locator stop selected should include a stop portion (such as the disk 61) for assisting in the positioning of a truss plank pattern and retaining truss planks in that pattern during manufacture, a sliding portion (such as the slide block 75) that enables the locator stop to move within the channel 30, and clamping means (such as the bolt 65) that clamps the lateral edge portions 56 of adjacent panels 50 between the stop portion and the sliding portion and thereby retains the primary locator stop 60 at the location in which it is clamped. An exemplary alternative positioning stop is illustrated in the Williams application. It is intended that the present invention encompass configurations in which the stop and slide portions directly contact the panel upper and lower surfaces and those in which there is some structure, such as a shim or overhanging channel lip, between the stop or slide portions and the table panels.

Figure 6:
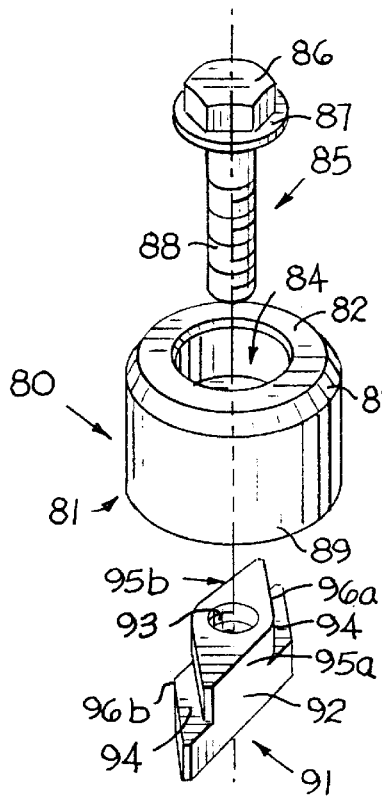
FIG. 6 is an exploded perspective view of a secondary locator stop.

Referring now to FIGS. 6, 11 and 12, an exemplary secondary locator stop 80 is illustrated. The secondary locator stop 80 includes a disk 81, a bolt 85, and a rotary T-nut 91. The disk 81 has the same configuration as the disk 61 described hereinabove; i.e., it includes an upper surface 82 and a sidewall 89 that merge into a bevelled surface 83, and further includes a recess 84 in the upper surface 82 leading to an aperture 90. Similarly, the bolt 85 has the same configuration as the bolt 65 described hereinabove; it has an hexagonal head 86, a collar 87 and a threaded shank 88. The rotary T-nut 91 includes a parallelogramatic body 92 having therein an aperture 93 and wings 94 extending from opposite sides of the body 92. The body 92 includes opposed sidewalls 95a, 95b which are continuous with the side edges of the wings 94; the body 92 also includes opposed side walls 96a, 96b which are angled relative to the sidewalls of the wings 94. The body 92 and wings 94 are sized such that, in a first rotated position, the nut 91 can be slipped into or lifted through one of the gaps 58; however, in a second rotated position, the body 92 can fit within the gap 58, but the wings 94 bridge the gap 58 from underneath. This configuration allows the nut 91 to be inserted into a channel 30 through a gap 58 from above, then rotated with the body 92 within the gap 58 so that the bolt 85 can be used to clamp two adjacent panels 50 between the disk 81 and the nut 91 (see FIGS. 11 and 12).

Turning now to FIGS. 7 through 12, the semi-permanent fixture 100 illustrated therein includes a pair of capture rails 102, each of which has a horizontally disposed inner panel 103, and a cross-member 104. The inner panels 103 and the cross-member 104 define therein an open-ended slot 105. A bearing insert 106 can be inserted onto the cross-member 104 to provide an additional bearing surface if so required; the bearing insert 106, which includes a bevelled surface 107, is removably secured to the cross-member 104 with two interference fit pins 109.

As illustrated in FIGS. 7, 8, and 10 through 12, the semi-permanent fixture 100 is secured to the truss table 20 via a secondary locator stop 108. The secondary locator stop 108 can be inserted into the open end of the slot 105, then tightened as described above to clamp the fixture 100 into position.

Figure 7:
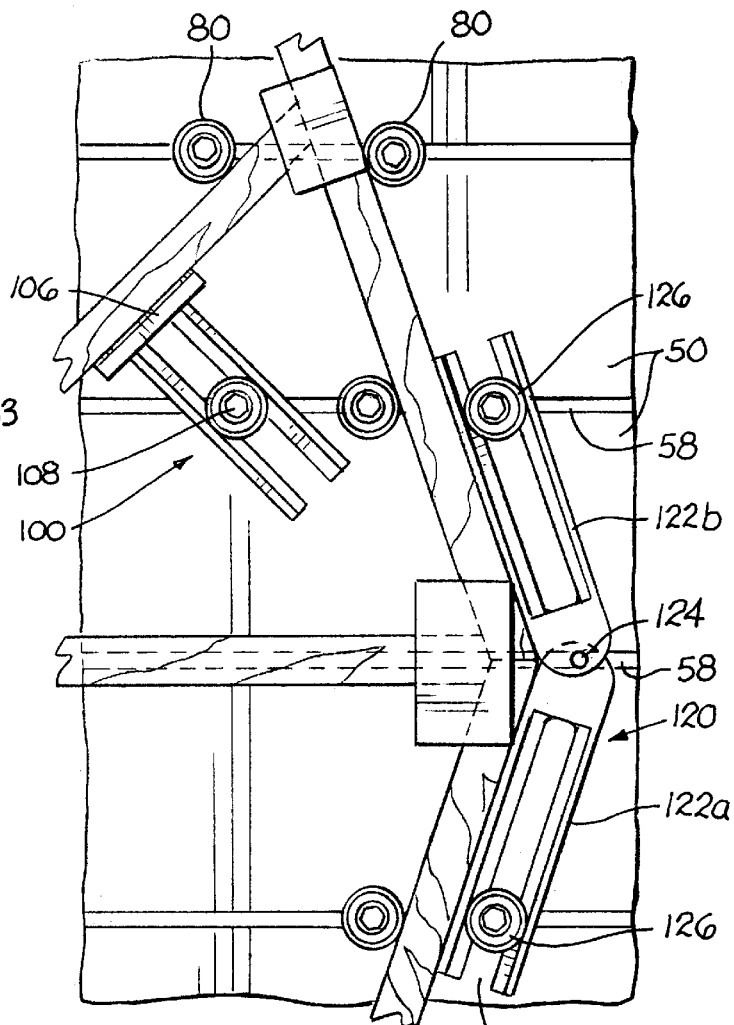
FIG. 7 is a partial view of a truss defined with primary and secondary locator stops and with both non-angled and angled fixtures.
Figure 8:
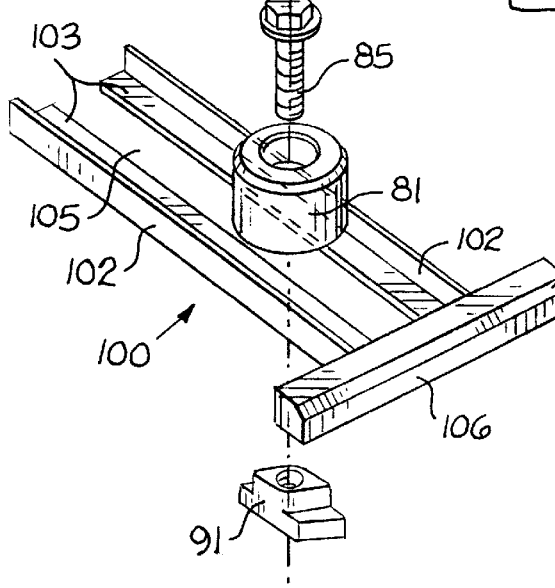
FIG. 8 is an exploded view of a secondary locator stop and a positioning fixture.
Figure 9:
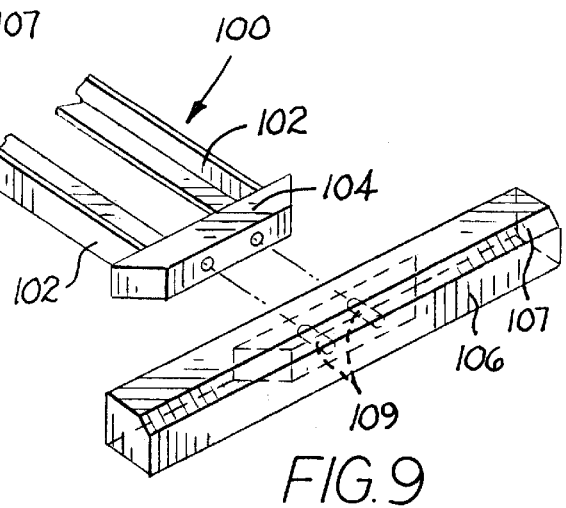
FIG. 9 is an exploded view of the positioning fixture of FIG. 8 with its bearing insert removed.

Referring now to FIGS. 7 and 13, an angled fixture 120 is shown. The angled fixture 120 includes two fixture halves 122a, 122b, each of which has slots 123 therein. The fixture halves 122a, 122b are configured very much like the semi-permanent fixture 100 with open-ended slots 125 included therein. However, the fixture halves 122a, 122b are interconnected via a pivot pin 124, which allows them to rotate relative to one another. Each of the fixture halves 122a, 122b includes corresponding positioning indicia 127 which enables them to be positioned at a desired angle, such as the obtuse angles illustrated in FIG. 7 and 13. Each fixture half 122a, 122b is secured to the truss table 20 via a secondary locator stop 126 in the same manner described above for the fixture 100.

Referring now to FIGS. 14 through 17, the ejector unit 140 includes a lifting mechanism 142, a mounting rail 144, and a plurality of ball bearings 146 mounted within mounting shells 148. The lifting mechanism 142 is configured to move the mounting rail 144 between a retracted position (FIG. 14), in which the ball bearings 146 are positioned in the channel 28 beneath the plane defined by the upper surfaces 52 of such table panels 50, and an extended position (FIGS. 15 and 16), in which the ball bearings 146 extend above the plane defined by the upper surfaces 52. Because the ball bearings 146 are free to rotate in any direction within their mounting shells 148, a truss supported by the ball bearings 146 is similarly free to move in any direction when the mounting nail 144 is extended. As such, a completed truss can be ejected from either the side or the end of a truss table 20. The lifting mechanism 142 is preferably activated by a pneumatic cylinder (not shown), but can be activated by other means, such as an electric motor or a hydraulic cylinder. Also, other lifting units, such as inflatable air springs or bags, telescoping rods, and the like, can be used with the present invention.

Figure 15:
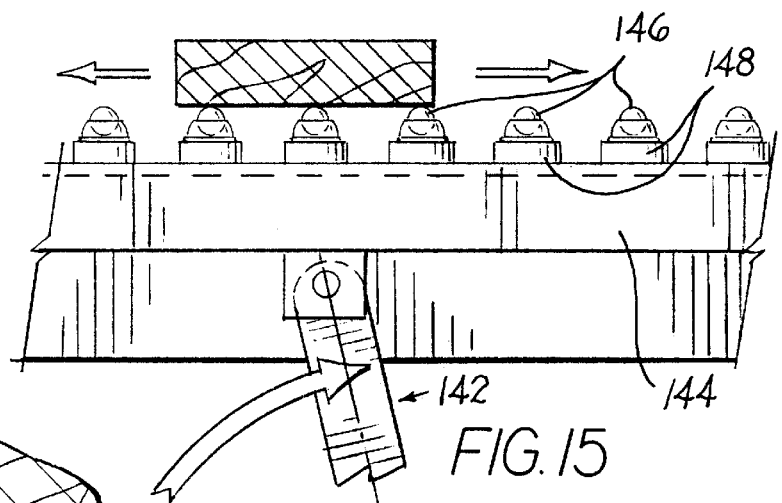
FIG. 15 is an enlarged side section view of a truss table showing the ejector rail in its extended position.
Figure 17:
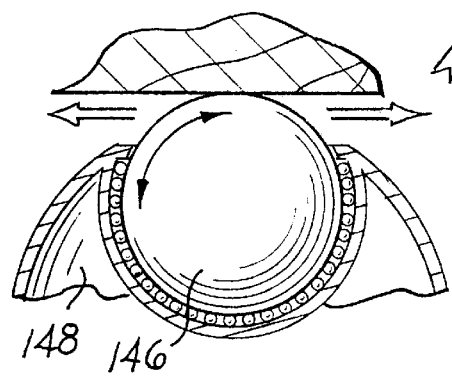
FIG. 17 is a greatly enlarged partial section view of a ball bearing mounted in its mounting shell.
Figure 15A:
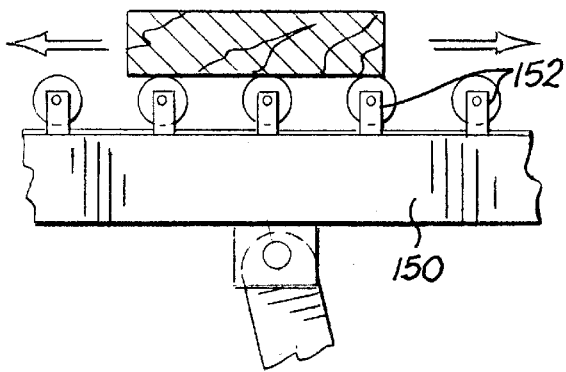
FIG. 15A is a side section view of an alternative embodiment of a lifting mechanism shown in the extended position.
Figure 18:
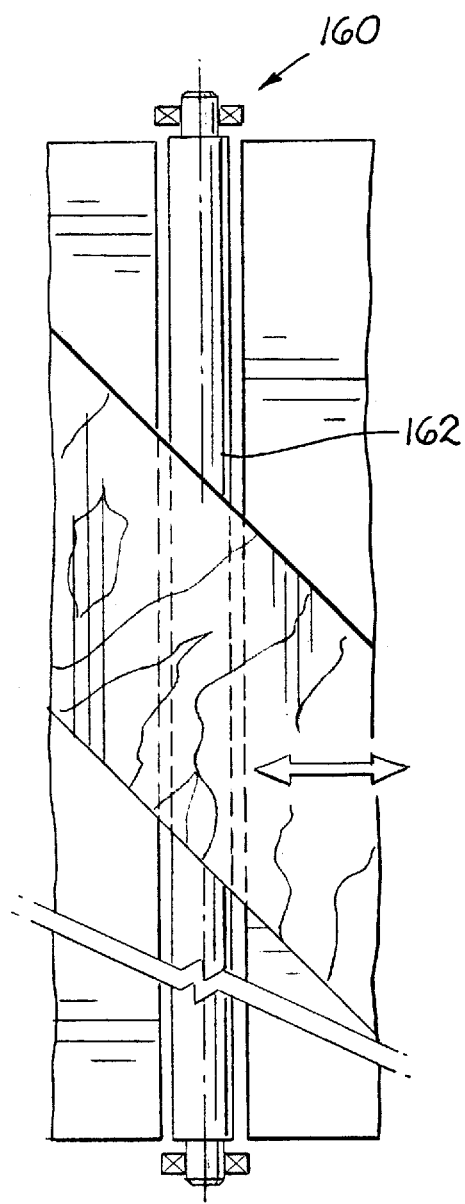
FIG. 18 is a partial plan view of another alternative embodiment of a lifting mechanism shown in the extended position.

In addition, alternative ejection units are illustrated in FIG. 15A, which shows a side eject mechanism 150 that includes a plurality of wheels 152, and FIG. 18, which shows an end eject mechanism 160 that utilizes an elongate roller 162.

In operation, each truss table 20 is first registered relative to other truss tables 20 to be employed in constructing a truss. This can be accomplished by positioning the truss tables 20 so that their channels 30 are parallel, then adjusting the magnetic scales 40 within the gaps 58 to align with each other (FIG. 3). Aligning can be performed by, for example, suspending a wire over one end of each truss table 20, then moving each of the scales 40 until its "0" mark aligns with the wire. Because the scales 40 include a magnetic lower surface 44 and the channel floor 32 is ferromagnetic, the scale 40 adheres to the floor 32 irrespective of their relative positions. As a result, the adjustment of the scales 40 for multiple truss tables 20 can be carried out quickly and efficiently.

The skilled artisan will also recognize that the scales 40 can be included in additional channels 30, or even in all channels 30. This configuration, once registered as described hereinabove, can provide a precise two-dimensional grid for the positioning of all locator stops. Such a grid would be particularly useful when employed in conjunction with a computer software program for generating locator stop positions.

Next, a desired position for each primary locator stop 60 is selected from a manual drawing or, more preferably, is provided by a truss construction software program such as the FREEFORM program noted above. Such a drawing or program should indicate the proper location of the positioning edge 78 of the slide block 75 relative to the measuring scale 40, which should in turn position the disk 61 at the desired location along the length of the channel 30. At this point the nut 71 and bolt 65 are loosened such that the disk 61 and the nut 71 are not clamped tightly to the lateral edge portions 56 of adjacent panels 50. The slide block 75 of the locator stop 60 then slides within the channel 30 to the selected position, with the sliding motion halted when the positioning edge 78 is aligned with the selected location on the positioning indicia 42 of the scale 40 (FIG. 4). At that point, the bolt 65 is tightened so that the disk 61 and nut 71 clamp onto, respectively, the upper surfaces 52 and lower surfaces 54 of adjacent panels 50 (FIG. 5). As it clamps against the lower surfaces 54 with its wings 73, the nut 71 rises somewhat from its seated position in the slide block 75 so that its body 72 is positioned within the gap 58, but a portion of the projection 74 remains captured within the recess 76. Once the bolt 75 is sufficiently tight, the primary locator stop 60 will remain in place as truss planks are positioned against it. Those skilled in this art will recognize that, although the illustrated configuration of the nut 71 is preferred, other configurations, such as those in which the body 72 and projection 74 take different shapes, are also suitable for use with the present invention. In particular, the body 72 should be configured so that at least a portion thereof can fit within the gap 58 and the wings 74 should be of sufficient length to bridge the gap 58.

After each of the primary locator stops 60 is in place, the truss planks can be placed into their proper positions, and the secondary locator stops 80 can be inserted into channels 30 to abut some or all of the truss planks. To insert a secondary locator stop 80 within a channel 30, the rotary T-nut 91 is rotated to a position in which the wings 94 extend toward opposite ends of the channel 30. In this position, the body 92 of the nut 91 fits within the gap 58 above the channel 30 and can therefore be lowered into the channel 30. The locator stop 80 is then lifted so that the sidewalls 96a, 96b are positioned within the gap 58 facing the edges of adjacent panels 50, with the wings 94 bridging the gap 58. Rotation of the bolt 85 approximately 45 degrees relative to the nut 91 causes the nut 91 to rotate until the sidewalls 96a, 96b contact the edges of the panels 50 and the wings 94 underlie the lower surfaces 54 of the panels 50. Continued rotation of the bolt 85 elevates the nut 91 and thereby causes the disk 81 and the wings 94 to clamp the adjacent panels 50 and thereby secure the secondary locator stop 80 thereto. Thus, the secondary locator stop 91 can be inserted into the channel 30 via the gap 58 rather than having to be inserted through an open end of the channel 30, which saves a significant amount of time during the set-up process.

It is also contemplated that the locator stops 60, 80 can be used in conjunction with a system, such as the "Jet-Set" set-up system produced by Omni, that automatically moves the locator stops 60, 80 to their designated positions in response to data generated by a computer software program and implemented via a central controller.

Those skilled in this art will appreciate that, although the illustrated configuration of the nut 91 is preferred, other configurations are also suitable for use with the present invention. For example, other configurations of the body 92 that enable the nut 91 to be slipped into channel 30 via the gap 58 rather than through the open end of the channel 30, yet still prevent rotation of the nut 91 during rotation of the bolt 85 (such as a different parallelogramatic shape, a hexagonal or octagonal shape, or the like) can be used. The wings 94 should, of course, be slender enough to slip through the gap 58 during insertion, but should be of sufficient length to bridge the gap 58 when rotated to underlie the panel lower surfaces 54.

It is also noteworthy that, in tightening the bolts 65, 85, the operator can use a standard ratchet-style wrench designed for hexagonal-headed bolts. This contrasts with the bolts included in prior art locator stops, which typically were Allen-headed bolts. These bolts presented problems in tightening because the standard Allen wrench is of insufficient length to provide enough torque to clamp the locator stop securely. However, the hexagonal heads of the bolts 65, 85 can be tightened with standard hex-head wrenches, which are typically long enough to provide sufficient torque for secure clamping. Also, the collars 67, 87 increase the surface area over which the clamping force is applied and thereby improve clamping.

Once the secondary locator stops 80 have been positioned in this manner, semi-permanent fixtures 100 and angled fixtures 120 can also be added to secure the truss. A fixture 100 can be secured to the truss table 20 by placing the bearing surface 106 in abutting relationship with a truss plank, then positioning the bolt 85 of a secondary locator stop 108 within the slot 105 (FIG. 10). The nut 91 can then be slipped into a channel 30 via a gap 58, and the bolt 85 can be tightened to clamp the inner panels 103 of the capture rails 102 against the upper surfaces 52 of adjacent panels 50. Those skilled in this art will appreciate that the capture rails 102 should be of sufficient length that they cross a gap 58 in which the secondary locator stop can be inserted; it is preferred that they be at least 6 to 12 inches in length.

Also, if an angled fixture 120 is to be used, it can be secured to the truss table by inserting locator stops 126 in each of the slots 123 of the fixture halves 122a, 122b. The positioning indicia 125 can be used to pivot the fixture halves 122a, 122b relative to one another to define a desired angle. The fixture halves 122a, 122b are then secured to the upper surfaces 52 of panels 50 with two secondary locator stops 126 in the manner described hereinabove for the fixture 100 so that side edges of the fixture halves 122a, 122b abut the edges of truss planks to be joined (see FIGS. 7 and 13).

It is also of note that, if the nut 91 is fully tapped, and can therefore continue to receive the bolt 85 as the bolt's lower end passes through the lower portion of the aperture 90, the same disks 81, bolts 85, and nuts 91 can be employed for both secondary locator stops 80 used to secure the fixtures 100 and 120 and for those used alone as described above.

Once the secondary locator stops 80 and fixtures 100, 120 are secured to the truss table 20, truss plates are positioned at the joints of the truss and pressed into the truss planks with a pressure roller. The completed truss is ejected with the ejector unit 140, and a new set of truss planks is positioned with the primary locator stops 60 and the secondary locator stops 80 as guides.

During the placement of new truss planks within the pattern defined by the locator stops 60, 80 and any fixtures 100, 120, on many occasions the operator will recognize that some of the planks are warped or bowed to a sufficient degree that the planks fail to fit within the desired pattern. Because the disks 61, 81 of the locator stops 60, 80 include the beveled surfaces 63, 83 between their upper surfaces 62, 82 and their side walls 69, 89, truss planks that are warped or bowed can be forced into position, as the bevelled surfaces 63, 83 urge the planks to take a position within the pattern as they receive downwardly-directed pressure. The bevelled surfaces 63, 83 also assist in the repositioning of warped truss planks that are forced out of their proper positions by the pressure roller during construction. The same effect is induced by the bevelled surface 107 of the bearing insert 106, which also urges bowed planks to take their positions within the desired pattern.

Figure 16:
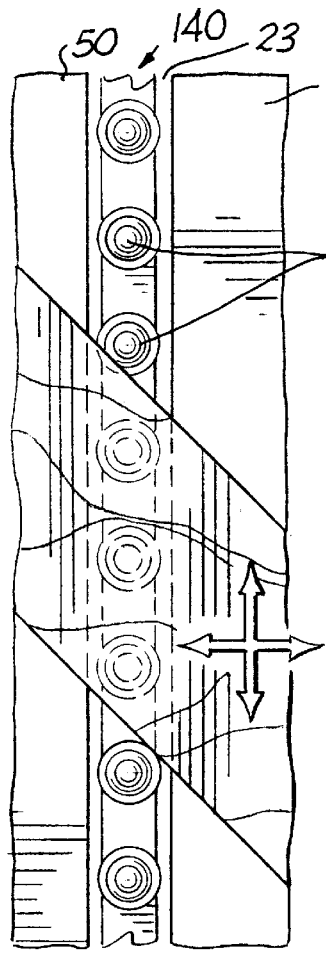
FIG. 16 is an enlarged partial plan view of a truss table with its ejector rail in the extended position illustrating how a constructed truss can be ejected in any direction.
Figure 14:
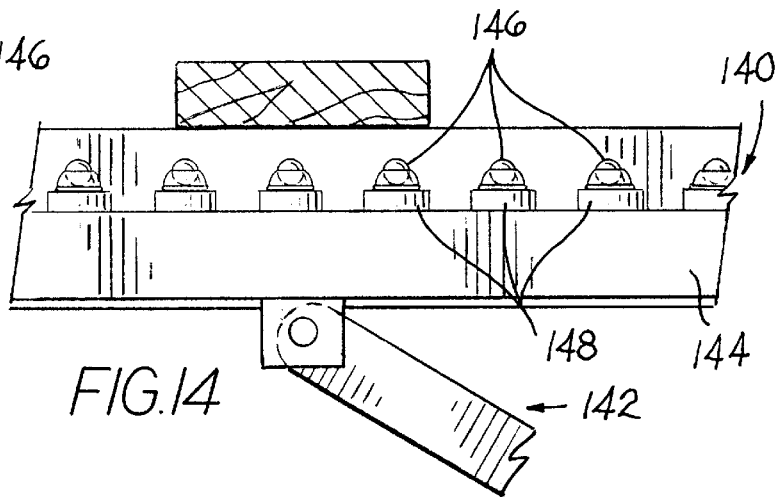
FIG. 14 is an enlarged side section view showing the ejector rail in its retracted position.

Once the truss has been formed on the truss table 20, it is ejected with the ejector unit 140 (FIGS. 14 through 17). The lifting mechanism 142 is activated by the pneumatic cylinder and causes the mounting rail 144 and the ball bearings 146 to rise above the plane defined by the panel upper surfaces 52 (FIG. 15). The mounting rails 144 of all of the truss tables 20 are lifted in unison, thereby lifting the truss from the upper surfaces 52 of all panels 50. Because the ball bearings 146 are free to rotate in any direction relative to their respective mounting shells 148, the truss can be easily ejected off the side or the end of the truss table 20 as desired (FIG. 16).

It will be understood by those skilled in this art that, although ball bearings 146 are preferred, other means for ejecting a truss from a truss table can also be used with the present invention. For example, a series of upright wheels mounted in rotating vertically-oriented spindles can also enable an operator to eject a truss in either direction. Such wheels can include detentes or other means for halting their rotation in a preferred orientation, such that all of the wheels can be aligned for end ejection or side ejection as desired.

The embodiments illustrated and described above disclose typical embodiments of the invention and, although specific terms are employed, they are used in a generic and descriptive sense only and not for the purposes of limitation, the scope of the invention being set forth in the following claims.

That which is claimed is:

1. A table for forming trusses, comprising:

a support frame;

first and second substantially horizontally-disposed elongate panels, each of said panels having an upper surface, a lower surface, and opposing lateral edge portions, said panels being positioned so that their respective upper surfaces are substantially coplanar and so that a first of said lateral edge portions of said first panel is in adjacent, non-contacting relationship with a first of said lateral edge portions of said second panel to form a gap therebetween;

a first channel having a generally horizontal floor and opposed side walls extending upwardly therefrom, one of said side walls supporting the lower surface of said first panel, and the other of said side walls supporting said second panel, said floor being supported by said frame and positioned beneath said gap so that said first lateral edge portion of said first panel and said first lateral edge portion of said second panel overhang said floor, said floor being formed of a ferromagnetic material; and magnetic positioning indicia means located within said channel and magnetically attached to said first channel floor.

2. The table defined in claim 1, wherein said magnetic positioning indicia means comprises a magnetic measuring scale.

3. A table for forming trusses, comprising:

a support frame;

first and second substantially horizontally-disposed elongate panels, each of said panels having an upper surface, a lower surface, and opposing lateral edge portions, said panels being positioned so that their respective upper surfaces are substantially coplanar and so that a first of said lateral edge portions of said first panel is in adjacent, non-contacting relationship with a first of said lateral edge portions of said second panel to form a gap therebetween;

a first channel having a generally horizontal floor and opposed side walls extending upwardly therefrom, one of said side walls supporting the lower surface of said first panel, and the other of said side walls supporting said second panel, said floor being supported by said frame and positioned beneath said gap so that said first lateral edge portion of said first panel and said first lateral edge portion of said second panel overhang said floor;

a first fixture for abutting a truss plank, said first fixture comprising a pair of elongate side rails, each of which includes opposed ends, a cross member attached to one of said ends of each of said pair of rails such that an open-ended elongate slot is defined by said cross member and said rails, and a bearing surface for abutting a truss plank, said first fixture resting atop one of said first and second panels with said rails being generally horizontally disposed and a portion of said slot overlying a portion of said first channel; and a securing unit that extends through said slot into said channel for securing said fixture to said table in position for said fixture bearing surface to abut a truss plank.

4. The truss table defined in claim 3, wherein said fixture bearing surface is releasably secured to said fixture cross member.

5. The truss table defined in claim 3, wherein said fixture bearing surface merges with a bevelled surface position above said bearing surface.

6. The truss table defined in claim 3, wherein said securing unit includes a disk that overlies said fixture rails, a retaining nut that is positioned within said channel, and a bolt that extends through an aperture in said disk and is threadedly received in said retaining nut.

7. The truss table defined in claim 6, wherein said retaining nut and said slot are sized and configured such that, when said retaining nut is in a first rotative orientation, said nut is sufficiently narrow to slip through said slot, and in a second rotative orientation, said nut is sufficiently wide that it cannot slip through said slot.

8. A table for forming trusses, comprising:

a support frame;

first, second and third substantially horizontally-disposed elongate panels, each of said panels having an upper surface, a lower surface, and opposing lateral edge portions, said panels being positioned such that their respective upper surfaces are substantially coplanar and so that a first of said lateral edge portions of said first panel is in adjacent, non-contacting relationship with a first of said lateral edge portions of said second panel to form a gap therebetween, and a second of said lateral edge portions of said second panel is in adjacent, non-contacting relationship with a first of said lateral edge portions of said third panel to form a second gap therebetween;

first and second channels, each of which has a generally horizontal floor and opposed side walls extending upwardly therefrom, one of said side walls of said first channel supporting the lower surface of said first panel, and the other of said side walls of said first channel supporting said second panel, one of said side walls of second channel supporting the lower surface of said second panel, and the other of said side walls of said second channel supporting said third panel, said floors being supported by said frame and positioned beneath one of said gaps so that said first lateral edge portion of said first panel and said first lateral edge portion of said second panel overhang said floor of said first channel and said second lateral edge portion of said second panel and said first lateral edge portion of said third panel overhang said floor of said second first channel;

a pivoting fixture for abutting a pair of adjacent truss planks, said pivoting fixture comprising two halves, each of which comprises a pair of elongate side rails and a cross member, wherein said cross member is attached to one ends of each of said pair of rails such that an open-ended elongate slot is defined by said cross member and said rails, said pivoting fixture resting atop at least one of said first, second and third panels with said rails being generally horizontally disposed and a portion of each of said slots overlying a portion of at least one of said first and second channels, said cross members of said fixture halves being pivotally interconnected; and first and second securing units, each of which that extends through a respective slot of a fixture half into an underlying first or second channel for securing said pivoting fixture to said table so that one of said rails from each fixture half defines a truss angle with one of said rail from the other fixture half, thereby providing an angled guide for positioning truss planks.

9. The truss table defined in claim 8, wherein said pivoting fixture further comprises positioning indicia on said fixture halves to indicate the magnitude of the truss angle.

* * * * *